INVENTOR
R C. SHELDON
BY Blassock, Downing
& Sebold,
ATTORNEYS

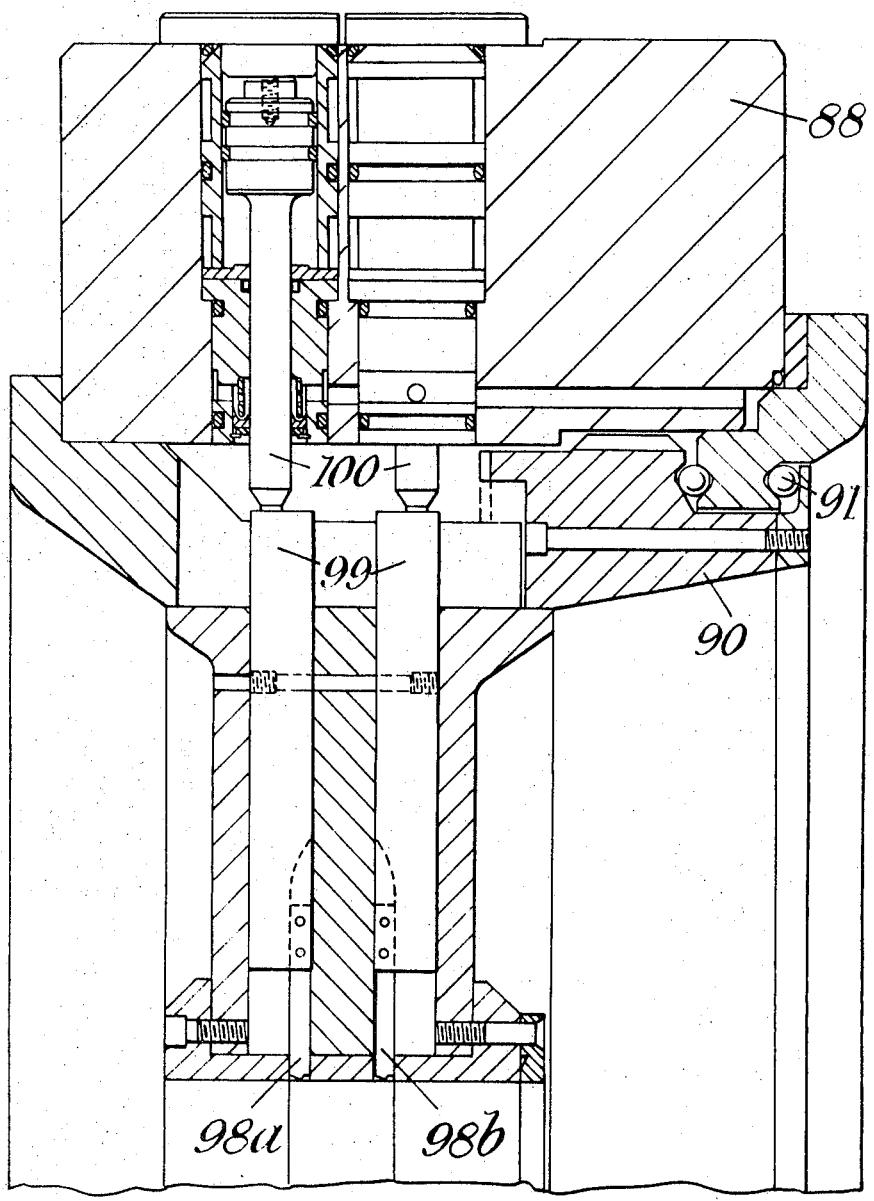
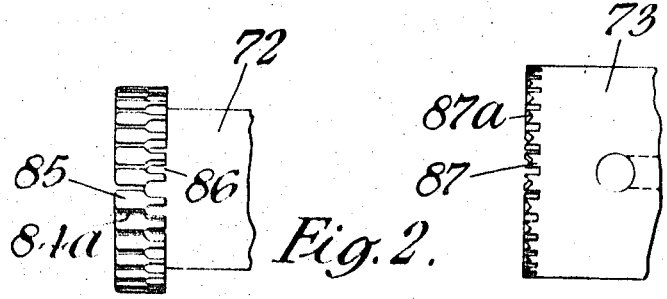
Fig. 4.
Fig. 3.
Fig. 2.

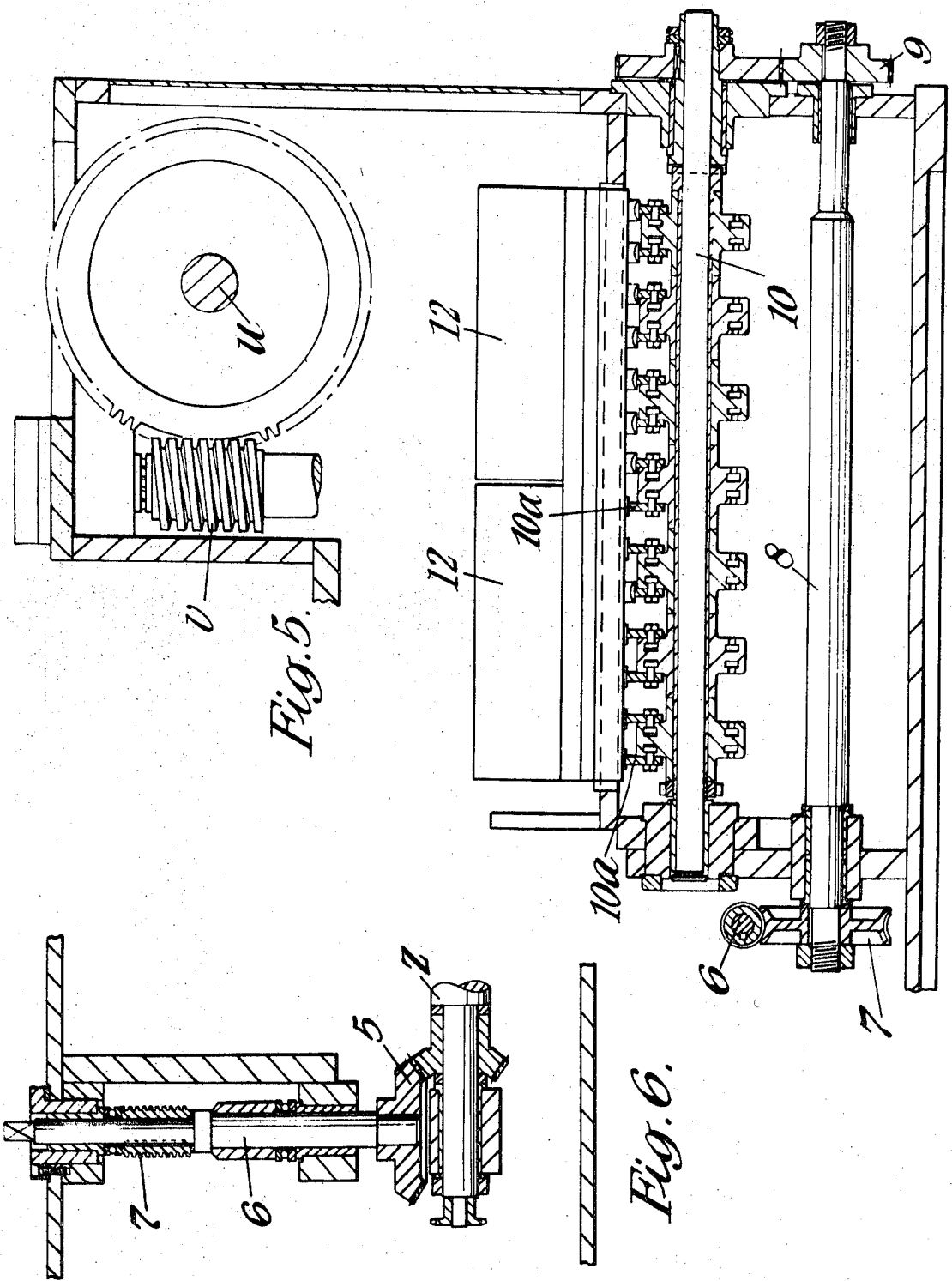

United States Patent Office 3,557,433
Patented Jan. 26, 1971

3,557,433
MACHINE FOR WINDING ARMATURES OF DYNAMO ELECTRIC MACHINES
Robert Cyril Sheldon, Warwickshire, England, assignor to Joseph Lucas (Industries) Limited, Birmingham, England, a British company
Original application July 8, 1963, Ser. No. 293,315, now Patent No. 3,413,714, dated Dec. 3, 1968. Divided and this application June 6, 1968, Ser. No. 742,116
Int. Cl. H02k 15/00
U.S. Cl. 29—205    17 Claims

ABSTRACT OF THE DISCLOSURE

A machine for winding the armature of a dynamo electric machine and for inserting the wires into slots formed in the commutator segments, the machine having a plurality of angularly spaced guides through which wires are fed in a generally radial inward direction. The armature is held by a reciprocable and angularly movable headstock spindle whereby wires from the guides will be laid in the slots of the armature as the armature is moved. In addition gripping means is provided on the headstock spindle for gripping the wires and the gripping means incorporates a first series of cutters which through radial inward movement insert the free ends of the wires into the slots and a second series of cutters which later in the winding operation sever the wires and insert the other ends of the windings in the slots and also pen the walls of the slots to retain the wires therein.

---

This application is a divisional application of my application Ser. No. 293,315 filed July 8, 1963, now Pat. No. 3,413,714 dated Dec. 3, 1968.

A known kind of machine for winding armatures of dynamo electric machines comprises in combination, a plurality of angularly spaced guides through which wires can be fed in a generally radial inward direction, a reciprocable and angularly movable headstock spindle, means at one end of the headstock spindle for gripping an armature spindle relative thereto, gripping means at said end of the headstock for gripping wires located in the guides, and means for imparting reciprocatory and angular movements to the headstock spindle whereby wires from the guides will be caused to be laid within longitudinal grooves in an armature gripped by the headstock spindle. An example of such a machine is described in the specification of Letters Pat. No. 2,620,139.

When using a machine as described in the aforesaid specification an end of each wire is gripped relative to the headstock spindle and only released therefrom after the full number of turns have been wound on the armature, the wire being severed after the gripped end has been released. Using such a machine each wire has two loose ends which need to be inserted and secured within slots in the appropriate segments of a commutator by subsequent operations after the armature has been removed from the machine.

The main object of the present invention is to provide a machine whereby the insertion of the wires into the commutator segments can be effected whilst the armature is in the machine.

A machine according to the invention and of the kind specified is characterized by the provision of cutters arranged to sever the wires and at the same time insert free ends thereof in slots in the segments of a commutator mounted on an armature spindle gripped in the means on the headstock spindle.

Figure 1:
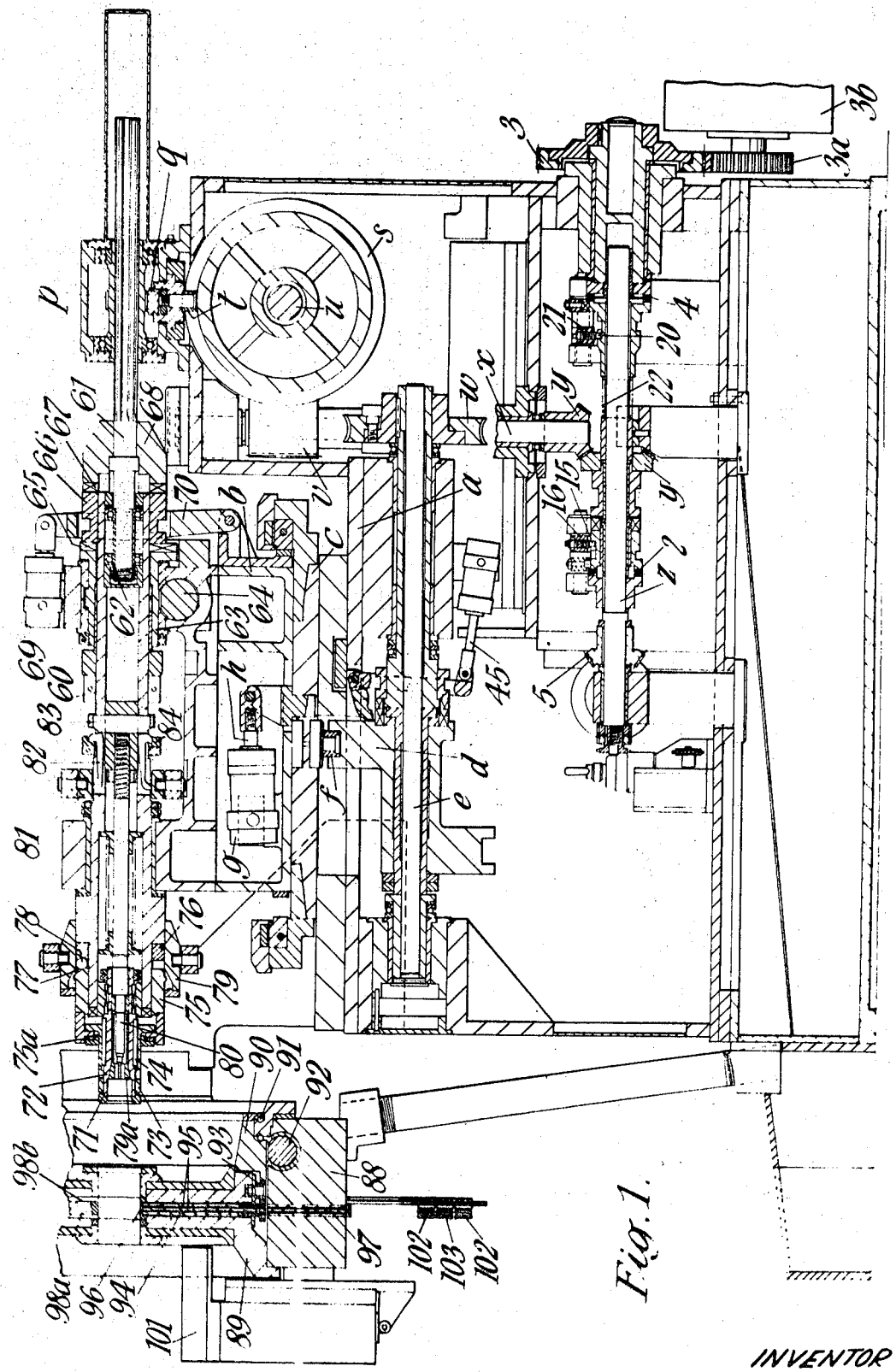
Figure 7:
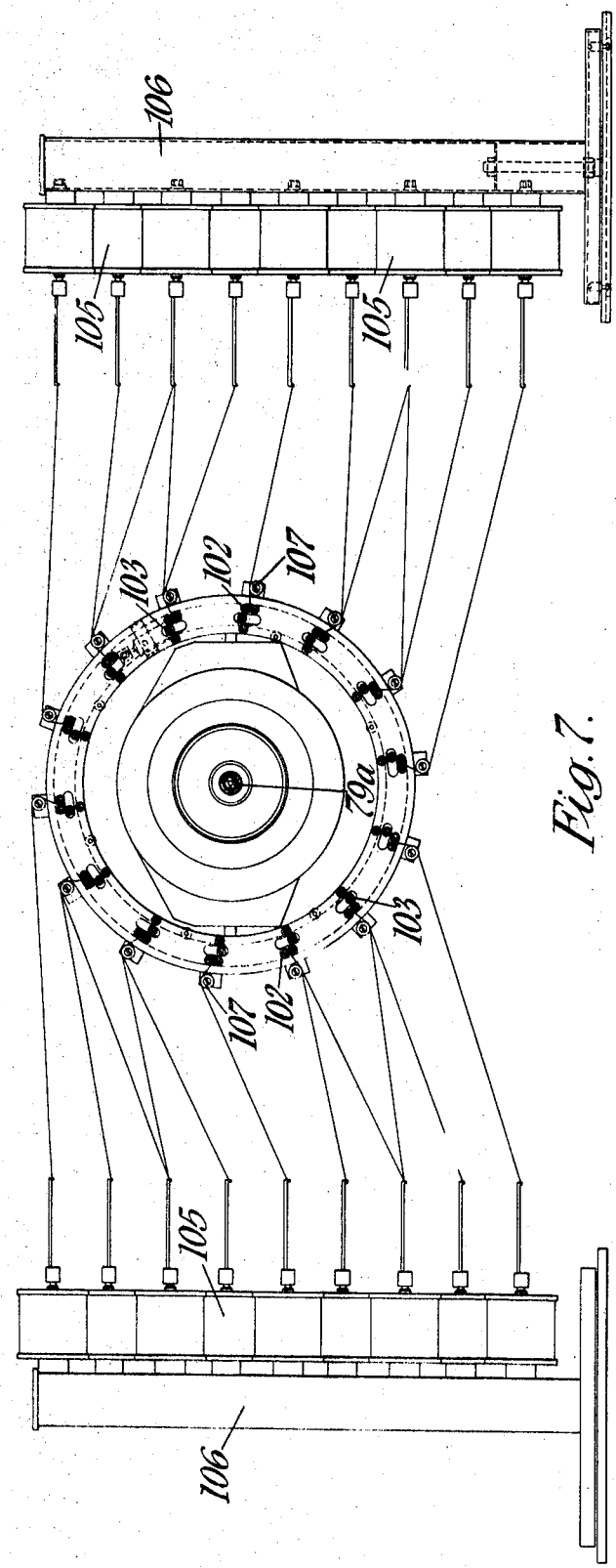
Figure 8:
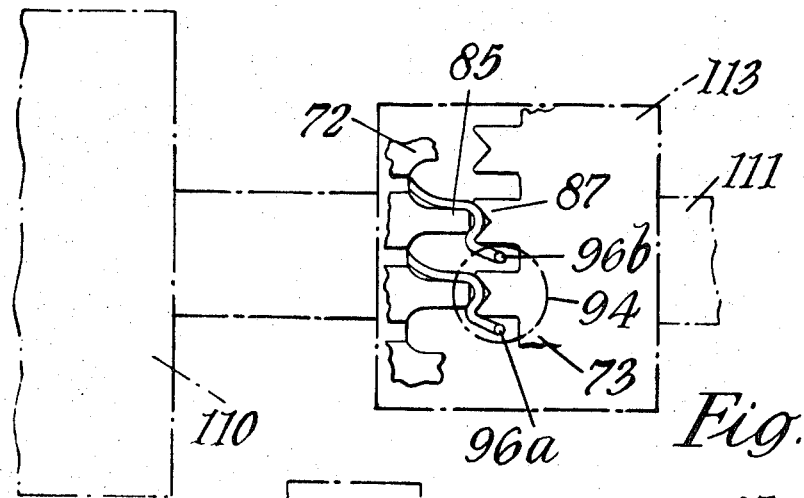

One example of a machine in accordance with the invention will now be described with reference to the accompanying drawings in which FIG. 1 is a side elevation of the machine
FIG. 2 is a fragmentary view of a part shown in FIG. 1
FIG. 3 is a fragmentary view of another part shown in FIG. 1.
FIG. 4 is a sectional fragmentary view of a part shown in FIG. 1 taken on a different section
FIG. 5 is a side elevation of a part of the machine not shown in FIG. 1
FIG. 6 is a view showing the connection between the part shown in FIG. 5 and the rest of the machine
FIG. 7 is an end elevation of the complete machine and
FIGS. 8–15 are diagrams illustrating the winding procedure.

Referring to the drawings there is mounted on a horizontal bed $a$ a two part headstock comprising a lower part $c$, which is slidably mounted on the bed, and an upper part $b$ which is slidable on the part $c$. For moving the headstock as a whole there is provided a cam $d$, which is mounted on a rotatable shaft $e$, and which is engaged by a peg $f$ secured to the part $c$. The part $b$ is movable relative to the part $c$ by a fluid operable piston $h$ and cylinder $g$.

Supported on the upper part of the headstock is an angularly movable hollow spindle 60 which is axially fixed relative thereto, and which at one end is rotatably supported in a hollow flanged member 63 itself angularly movable relative to the headstock. Supported by bearings 62 in this end of the spindle is a shaft 61 which is in spline engagement with a pinion $p$ adapted to be moved angularly by a rack $q$ in turn movable through a follower $t$ by a rotary cam $s$ which is mounted on a shaft $u$.

Formed on the outer periphery of the member 63 is a pinion which is engaged by a rack 64 movable by a fluid operable piston and cylinder combination. Moreover, formed on the flanged portion of the member are a plurality of dog teeth 65 which are engageable with complementary dog teeth formed on an axially slidable part 66 non-rotatably mounted on the spindle 60. Moreover, formed on the opposite face of this part are further dog teeth which may be engaged with complementary dog teeth 67 formed on the adjacent end face of a part 68 secured to the shaft 61. The part 66 is movable axially by a fluid operable piston and cylinder combination 69 by way of a fork lever 70 and the arrangement is such that when the fork is in one position (as shown in FIG. 1) the spindle will be connected to the flanged member 63 and when in the alternative position will be connected to the shaft 61.

The other end of the hollow spindle extends beyond the headstock and has mounted thereon a gripper 71. The gripper comprises a hollow cylindrical inner part 72 which extends from, but is non-rotatably mounted within the spindle, and a hollow cylindrical outer part 73 which is axially slidable on the periphery of the inner part but is secured against angular movement relative thereto by a spline connection 74. The outer part is connected through resilient means 75a to a cylindrical sleeve 75 slidably mounted on the periphery of the spindle and in the adjacent faces of the sleeve 75 and a ring 76, secured on the spindle, are a plurality of notches which together define a plurality of Vee notches 77. In the notches 77 are mounted a plurality of balls 78 respectively which are arranged to be moved radially inwards by an axially movable sleeve-like actuating member 79 to cause the outer part of the gripper to move relative to the inner part.

Within the hollow inner part 72 of the gripper is mounted a collet 79a which bears against an inclined face formed on the internal periphery of the inner part 72 and which is movable axially relative thereto to close the jaws thereof, by means of a spring loaded actuating rod 80. The rod is moved by fluid operable means (not shown)

through an actuating ring 81 and a plurality of actuating fingers 82 which bear against a pin 83 secured to the rod and also against an abutment ring 84 mounted on the spindle.

Referring to FIG. 2 there is formed on the end of the inner part 72 of the gripper remote from the spindle an outwardly directed flange which has a plurality of equi-angularly spaced and axially extending slots 84a formed therein. Over a portion of the length of the flange the slots fined a plurality of tongues 85. Furthermore, portions of the adjacent faces of the tongues are cut away to define to the internal periphery of the part and there is thus de-recesses 86 and there are as many slots as there are commutator segments on the armature to be wound. Moreover, the adjacent face of the outer part 73, shown in FIG. 3, is also slotted to define further tongues 87 which are recessed at their edges adjacent the inner member to define 90° V-grooves 87a respectively having their sides inclined for co-operation with means to be described. Moreover, the inner and outer parts are connected together by the spline 74 in such a manner that the tongues on each part are angularly aligned with each other.

Mounted on the bed adjacent the spindle is a wire feed mechanism which comprises a fixed annular body part 88 having its axis co-incident with the axis of the spindle. Secured within the aperture defined by the body part 88 is a flanged ring 89 having its external diameter smaller than the diameter of the aperture and having its internal diameter large enough to accommodate an armature to be wound. Also mounted on the body is an actuating ring 90 which has a flanged portion extending into the annular aperture defined between the flanged ring 89 and the body part 88. The ring 90 is mounted in bearings 91 for angular movement relative to the body part about the axis of the spindle and has formed on a part of its external periphery a plurality of gear teeth which are engaged with a rack bar 92 arranged to be actuated by a fluid operable piston (not shown). Moreover, formed on the flange portion of the actuating ring are gear teeth for engagement with a plurality of pinions 93 pivotally mounted on the flanged ring 89 there being half as many pinions as there are segments on the commutator of the armature to be wound. The pinions engage with toothed portions formed on a plurality of angularly movable guide tubes 94 which are radially and equi-angularly disposed in the flanged ring 89 respectively. The arrangement is such that when the rack bar 92 is moved the guide tubes will be moved about their longitudinal axes through 90° for a purpose to be described. Within the guide tubes are a pair of spaced drillings 95 which terminate, at the end of the guide tube which will be adjacent the armature, in tungsten carbide nozzle jets 96 incorporating orifices 96a, 96b (see FIG. 8). Associates with the guide tubes 94 are outer wire guides 97 respectively which are constructed to permit wire drawn therethrough to partake of a gradual twist when the guide tubes 94 are moved angularly as described. Adjacent each guide tube 94 are two pairs of cutters which are mounted for radial movement in the flanged ring 89. The cutters are disposed on opposite sides of the guide tube respectively in a longitudinal direction and when the orifices 96a, 96b are circumferentially aligned a pair of cutters is longitudinally aligned with an orifice. For convenience the cutters on one side of the tubes are referenced 98a and those on the other side 98b. The cutters are mounted on radially movable slides 99 respectively (see FIG. 4) which are in turn connected to fluid operable pistons 100 respectively mounted within the body part 88. Moreover, the ends of the cutters are shaped for co-operation with cutting edges within the slots 84a formed in the part 72.

Also mounted on the body part 88 is an armature loader 101 upon which an armature to be wound is placed. The loader incorporates a positioning peg which engages with an armature slot to align the armature before it is inserted into the machine as will be described. Furthermore, the loader is movable by a fluid operable piston (not shown) which is operable to position the armature with the axis of the spindle.

Associated with the outer wire guides 97 respectively are a pair of fixed pulleys 102 around which wire fed to the guides is passed. Moreover, further pulleys 103 are provided intermediate the pairs of pulleys 102 respectively and these pulleys are mounted for angular movement about the axis of the spindle whereby the tension on the wire fed to the machine may be controlled.

The wire is fed around the pulleys 102, 103 from reels 105 (see FIG. 7) disposed on supports 106 mounted adjacent the wire feed mechanism there being provided guide pulleys 107 for guiding the wire between a pair of pulleys 102.

The shafts $e$, $u$ carrying the two cams $d$ and $s$ connected through worm gearing $v$ and $w$, an intermediate shaft $x$ and bevel pinions $y$ to a first motion shaft $z$, the bevel pinion of the shaft being engageable with the shaft $z$ through a clutch 2 which is controlled as hereinafter described. The shaft $z$ is connected, through a clutch 4, to gearing 3, 3a and to a motor 3b the clutch 4 being controlled by an attendant or by automatic means as hereinafter described. From the first motion shaft $z$ motion is taken by gearing 5 to a cam shaft 10 (FIG. 5) on which is mounted a plurality of cams 10a arranged to actuate valves 12 for controlling the aforementioned fluid operable pistons.

The mechanism interposed between the cam shaft and the gearing 5 comprising an intermediate shaft 6, worm gearing 7, a counter shaft 8 and gearing 9.

The slidable member of the clutch 2 has formed around its periphery a groove having a helical or cam shaped side face which can be engaged by a peg 15 on a lever 16 which is loaded by a spring and one end of this lever co-operates with a cam on the cam shaft. So long as the lever is in contact with the periphery of the associated cam the peg is held clear of the groove and the clutch parts are interengaged by springs. However, when a notch in the cam comes adjacent to the lever, the peg engages the clutch groove under the action of the spring, and the interaction of the peg and the cam faces of the said groove causes the clutch parts to be separated for arresting the action of the cams $d$ and $s$.

The slidable member of the clutch 4 is also formed with a peripheral groove having one of its faces shaped to a helical or cam like form. This groove is engageable by a peg 20 on a lever 21 which is also spring loaded. The lever is similar to the lever 16 and is also actuated by a cam on the camshaft. Also the lever is operable by the attendant to enable the spring 22 to engage the clutch. In order to start the machine the attendant raises the lever 21 by any convenient means (not shown). The spring then moves the slidable clutch member into engagement with its complementary member thereby setting the machine in motion. During the subsequent action of the machine the lever 21 is held out of action by the associated cam. At the end of the cycle the cam releases the lever 21 and allows it to re-engage the sliding clutch member in order to disengage the clutch and stop the machine. During the initial part of the cycle the peg 15 of the lever 16 is disengaged from its associated sliding clutch member to enable the clutch 2 to be engaged. In each complete cycle the clutch 2 is disengaged after the appropriate number of turns have been wound on the armature and then the clutch 4 is disengaged when the cycle is completed to stop the machine. The clutch 2 is also disengaged after two turns have been wound on the armature as will be described.

For the purpose of explaining how the machine operates reference will be made to FIGS. 8–15 in which rotation of the armature is indicated by displacement of the guide tube, it will be assumed that a wound armature has just been withdrawn from the machine and an unwound armature 110 is already mounted on the loader 101. At the end of the cycle the orifices 96a, 96b are circumferentially aligned and the wires which issue from them are respectively held between the tongues 85 and 87 of the inner and outer parts of the gripper respectively.

When the attendant starts the machine the loader containing the unwound armature is raised by the fluid operable piston, as described, to bring the axis of the armature co-incident with that of the machine spindle. The armature is then pushed into the machine by the attendant to that the shaft 111 at the commutator end of the armature enters the collet 79a until its end face abuts adjacent a stop contained therein. This position being illustrated in FIG. 8 of the drawings.

Figure 9:
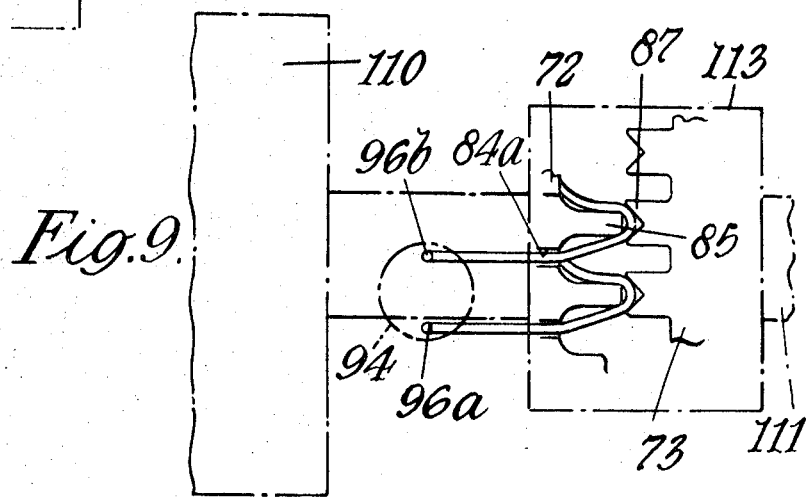
Figure 10:
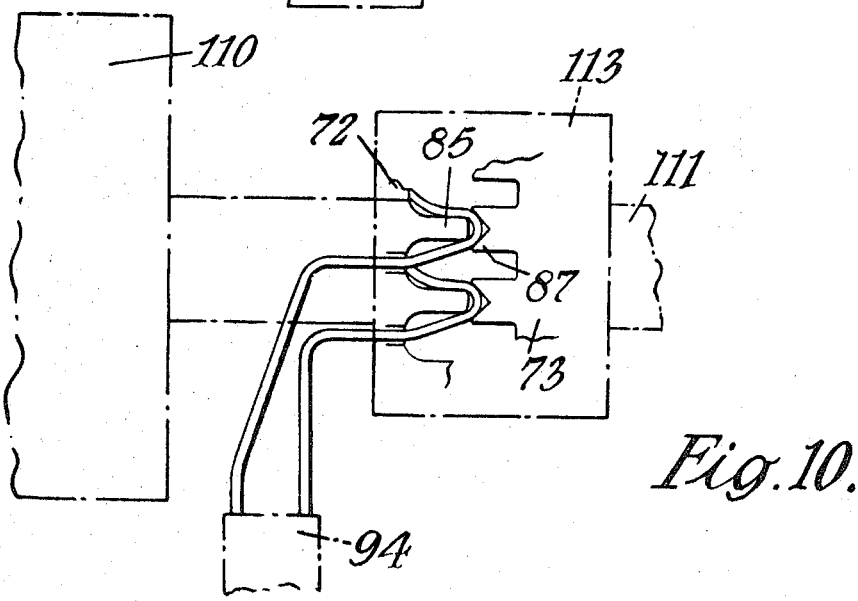

As soon as the armature is loaded the attendant operates a pedal (not shown) to energise the fluid actuating means, which controls the position of the actuating ring 81, thus causing the collet 79a to be tightened onto the shaft of the armature. The clutch 4 is then engaged by the attendant as described and the fluid operable piston g is then operated to retract the armature away from the wire feed mechanism in the direction of the bed as shown in FIG. 9 at the same time causing the wires issuing from the orifice, to be hooked around the tongues of the inner part 72 of the gripper and to be laid in the slots 84a thereof. The spindle is then caused to move through 90° this being effected by the cam s the shaft v of which is coupled to the main shaft z through the clutch 2 which is closed for this purpose by the associated cam on the cam shaft. Moreover, the teeth on the sliding part 66 are engaged with the teeth 67 to effect connection between the spindle 60 and the shaft 61. The purpose of the initial 90° movement is an electrical requirement in the design of the armature.

Figure 11:
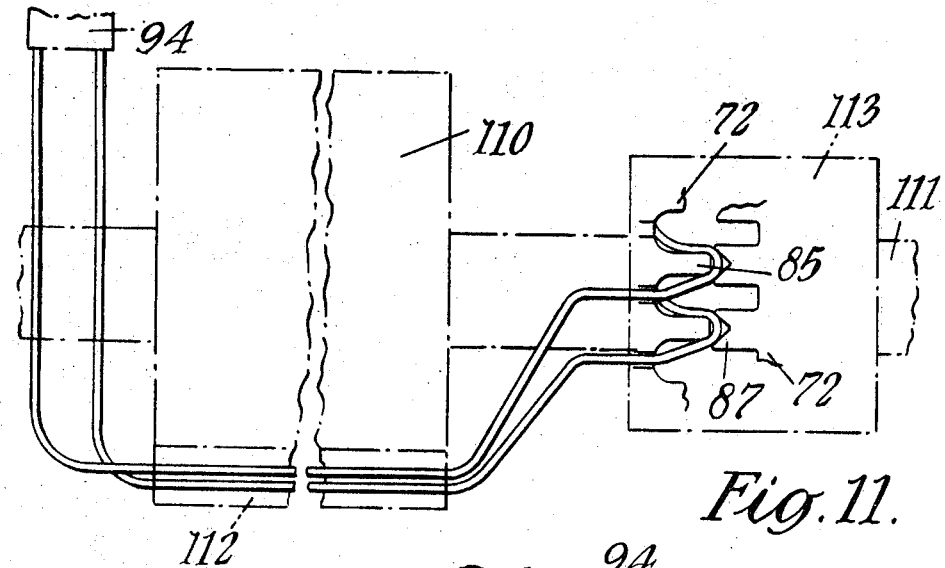

The guide tubes 94 are then moved about their longitudinal axes through 90° so that the orifices 96a, 96b are longitudinally aligned so that when winding commences, as hereinafter described the wire issuing from the orifices will be laid in the slots of the armature. In this position, shown in FIG. 10, the winding of the armature can commence and for this purpose the cam d is connected to the shaft e by operation of the fluid operable piston 45. The forms of the cams s and d are such that axial movement in the direction of the bed will first be imparted to the armature to cause wire to be laid in a slot 112 thereof then an angular movement of 180°, and firmly an axial movement away from the bed and towards the wire feed mechanism to complete one turn as shown in FIG. 11. This process is repeated to complete a second turn.

At the completion of the second turn the spindle is locked to the flanged member 63 by operation of the fluid operable means 69, thereby aligning slots in the commutator, into which the wires are to be inserted with the cutters 98b.

Figure 12:
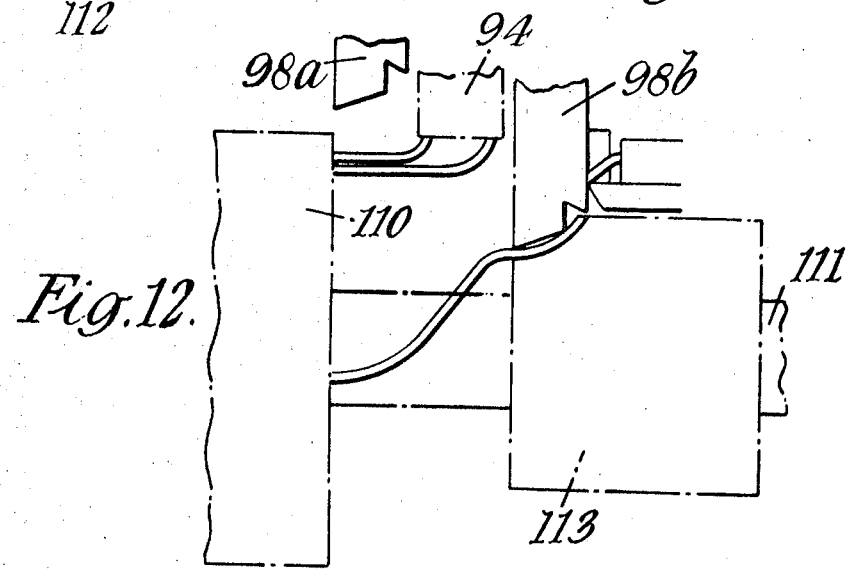

The pistons 100 associated with the cutters 98b are then subjected to fluid pressure and as shown in FIG. 12 the cutters pass through the slots 84a and the wires respectively are cut between the cutters and the adjacent faces of the inner part. Moreover, continued inward movement of the cutters forces the wires into the slots within the segments respectively of the armature. The cutters are then withdrawn and the spindle is re-engaged with the shaft 61 by operation of the fluid operable means 69 and the winding sequence described above is repeated until the full number of turns have been wound on the armature. During the initial part of this latter winding sequence the actuating member 79 is moved to permit the outer part 73 of the gripper to move axially so as to release the retained hook like portions of the wires. Moreover, in order to facilitate this removal an air blast associated with the gripper and controlled by a cam on the cam shaft 10, is operated to blow the hooks clear of the machine.

At the end of the winding sequence the armature is moved through 90° in the opposite direction to the initial 90° movement and for the same purpose. The spindle is then re-engaged with the flanged member 63 and by operation of the rack 64 the armature is angularly moved in the reverse direction by an amount equivalent to the pitch angle of the commutator segments.

Figure 13:
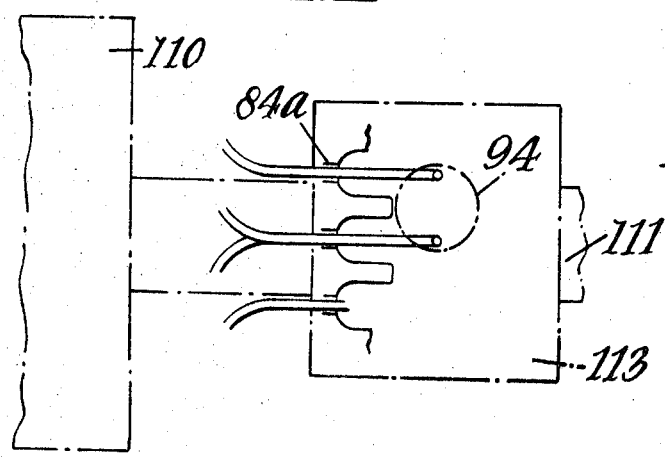
Figure 14:
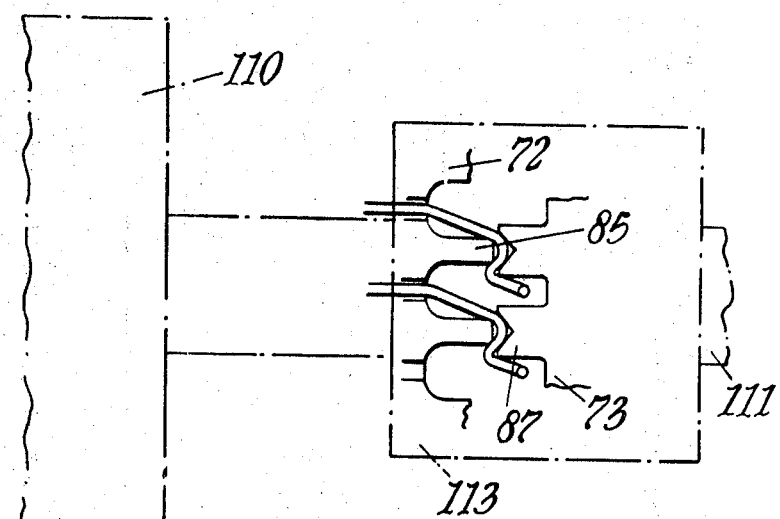
Figure 15:
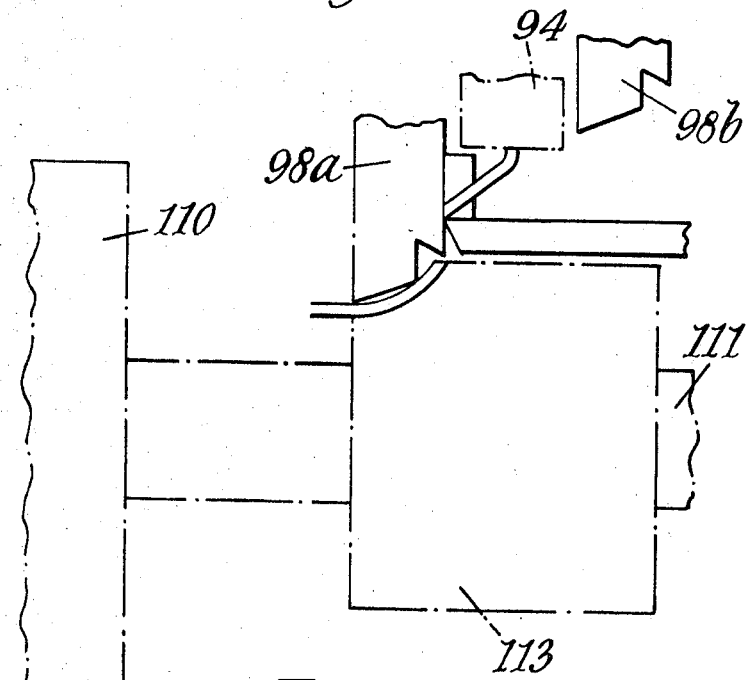

The guide tubes 94 are then moved about their axes through 90° and by operation of the fluid operable piston and cylinder h.g. the wires issuing from the orifices 96a, 96b are drawn through slots 84a as shown in FIG. 13 of the inner member 72 of the gripper. The rack 64 is again operated and the wires are hooked around the tongues of the inner part of the gripper which is then closed (FIG. 14) to grip the wires between the inner and outer parts thereof. Finally as shown in FIG. 15 the cutters 98a are moved radially inwards to sever the wires respectively and insert them into the appropriate slots in the segments respectively of the commutator 113. These cutters are of such a width that as the wires are inserted into the slots in the segments a portion of the wall of said slots will be peened over to retain the wires in position during subsequent operations on the armature.

Finally the collet 79a is released and the completed armature is withdrawn from the machine leaving the wires retained on the gripper as described ready for another armature to be wound.

Having thus described my invention what I claim as new and desire to secure by Letters Patent is:

1. An armature winding machine for winding armatures having a commutator at one end comprising a rotatable and axially movable armature supporting head stock, chuck means to grip the commutator by the commutator end in a predetermined axial position on said head stock, wire guides surrounding said armature when supported in said head stock, wire gripper means to grip the ends of the wires including an annularly slotted means and a clamp element surrounding said armature commutator when supported in said head stock, means to move said head stock axially and rotatably to move said armature axially and rotatively with respect to said wire guides whereby said wires are partially wound on said armature while the wire ends are held by said wire gripper means, first means to insert said wires in slots in said commutator and to simultaneously sever the ends of said wires held by said wire gripper means after partial winding of said armature, said wire gripper means being adapted to again grip said wires upon completion of winding of said armature and second means associated with said gripper means adapted to sever said wire and to insert the severed ends in slots in said commutator after completion of winding, said second means peening the walls of said slots to retain the ends of the winding.

2. In an armature winding machine having a bed, a head stock spindle supported by said bed to support an armature to be wound, a plurality of wire guides, gripping means to grip said wires closely adjacent the commutator bars of an armature to be wound for a time during which the armature is partially wound, first and second severing means positioned adjacent said wire guides, means to actuate said first severing means after partial winding, said first severing means inserting the ends of the windings into the slots said means to grip said wires being adapted to again grip said wires adjacent said wire guides upon completion of said winding adjacent said commutator and means to actuate said second severing means, said second severing means inserting the ends of the windings into the slots and peening the walls of said slots to retain the wires in position.

3. The machine as claimed in claim 2 in which said gripping means comprises, in combination, an inner cylindrical part, one end of which is secured to the headstock spindle, an outer hollow cylindrical part axially slidable on said inner part but prevented from angular movement relative thereto, said inner part having formed on its end remote from the headstock spindle a peripheral flange formed with a plurality of equi-angularly spaced tongues between which, and the adjacent face of the inner part, the wires issuing from the guides are gripped, and clamping means for moving said outer part relative to said inner part.

4. The machine as claimed in claim 3 in which the severing means co-operate with slots formed in the first and second face of the outer part of the gripping means which is presented to the tongues.

5. The machine as claimed in claim 3 in which the inner cylindrical part is of hollow cylindrical form and is arranged to overlie the commutator of the armature to be wound during the winding operation.

6. The machine as claimed in claim 5 in which a portion of the internal periphery of said inner cylindrical part which is adjacent the headstock spindle is tapered and an axially movable collet having a complementary taper is mounted therein, said collet being arranged to grip the shaft of an armature to be wound.

7. The machine as claimed in claim 6 in which said clamping means comprises a sleeve slidably mounted on the head stock spindle and connected to said outer part, the end of said sleeve remote from said outer part defining with a step formed on the head stock spindle, a notch, a cam member located in said notch, and a ring surrounding the head stock spindle and shaped for co-operation with said cam member whereby when the ring is moved in a direction towards the gripper the cam member will urge the sleeve axially on the head stock spindle, thereby causing the inner and outer members of the gripper to be moved into gripping engagement with the wires.

8. A machine as claimed in claim 7 in which the cam member is in the form of a ball.

9. A machine as claimed in claim 7 in which resilient means is interposed between the outer member of the gripper and the clamping means whereby different diameters of wire can be accommodated without requiring adjustment of the gripper or clamping means.

10. A machine as claimed in claim 9 in which the wire guides are equi-angularly spaced in an annular part which is fixed relative to said bed serving to support the spindle, there being provided on the bed means for axially reciprocating, and angularly moving, the head stock spindle whereby an armature carried thereby will be moved relative to the guide to effect the laying of wires in slots formed in the armature.

11. A machine as claimed in claim 10 in which the severing means are mounted adjacent the first and second wire guides respectively in said annular part.

12. A machine as claimed in claim 11 in which the first and second severing means comprises two series of cutters disposed on opposite sides of the guides respectively, the first of said series of cutters being provided for severing the wires and inserting them into the slots in the commutator after a limited number of turns, less than the required number of turns, have been wound on the armature, and the second of said series of cutters being arranged to sever the wires and insert them into the slots when the full number of turns have been wound.

13. A machine as claimed in claim 12 in which the guides each carry a pair of wires and are mounted for angular movement about axes radial relative to the head stock spindle whereby gripping of the wires by the gripper, and laying of the wires in the armature slots, is facilitated.

14. A machine as claimed in claim 13 in which there is associated with each guide two cutters of each of said first and second series of cutters.

15. An armature winding machine having wire guide means to feed winding wire and means to move an armature to be wound axially and rotatably with respect to said wire guide means to wind said winding wire on said armature to be wound, and wire clamping means to hold wire ends adjacent a commutator means on said armature to be wound while said wire guide means partially winds said armature to be wound, said wire clamping means being further adapted to receive and grip said wire adjacent said commutator upon completion of the winding of said armature to be wound, and severing means co-operatively associated with said wire clamping means to sever said wire upon completion of the winding of said armature.

16. The armature winding machine of claim 15 in which said severing means insert the severed ends of the wires into slots in the commutator.

17. The armature winding machine of claim 16 in which the severing means is provided in co-operative association with said wire clamping means to sever said wire and to insert the severed wire ends into slots in said commutator, said severing means peening the walls of said slots to secure the ends of the wires in said slots.

References Cited

UNITED STATES PATENTS

| | | | |
|---|---|---|---|
| 3,002,259 | 10/1961 | Fletcher et al. | 29—205X |
| 3,169,301 | 2/1965 | Fletcher et al. | 29—205X |
| 3,413,714 | 12/1968 | Sheldon | 29—596 |

THOMAS H. EAGER, Primary Examiner